(12) United States Patent
Park et al.

(10) Patent No.: US 7,217,477 B2
(45) Date of Patent: May 15, 2007

(54) NON-AQUEOUS ELECTROLYTE ADDITIVE FOR IMPROVING SAFETY AND LITHIUM ION SECONDARY BATTERY COMPRISING THE SAME

(75) Inventors: Hong-Kyu Park, Taejeon (KR); Jeh-Won Choi, Seoul (KR); Yeon-Hee Lee, Jeollanam-do (KR); Young-Tack An, Taejeon (KR); Hyeong-Jin Kim, Taejeon (KR)

(73) Assignee: LG Chem, Ltd., Seoul (KR)

( * ) Notice: Subject to any disclaimer, the term of this patent is extended or adjusted under 35 U.S.C. 154(b) by 293 days.

(21) Appl. No.: 10/312,674

(22) PCT Filed: May 22, 2002

(86) PCT No.: PCT/KR02/00972

§ 371 (c)(1),
(2), (4) Date: Dec. 31, 2002

(87) PCT Pub. No.: WO02/095861

PCT Pub. Date: Nov. 28, 2002

(65) Prior Publication Data

US 2003/0175596 A1 Sep. 18, 2003

(30) Foreign Application Priority Data

May 22, 2001 (KR) ............................ 2001-0028062
Mar. 15, 2002 (KR) ............................ 2002/0014061

(51) Int. Cl.
*H01M 6/18* (2006.01)
*H01M 6/16* (2006.01)

(52) U.S. Cl. ................. 429/306; 429/324; 429/326

(58) Field of Classification Search ................ 429/306, 429/324, 326, 336
See application file for complete search history.

(56) References Cited

U.S. PATENT DOCUMENTS 5,633,098 A  5/1997 Narang et al.

6,159,635 A * 12/2000 Dasgupta et al. ........... 429/216

FOREIGN PATENT DOCUMENTS

| JP | 10-064591 A | 3/1998 |
|----|-------------|--------|
| JP | 11-126632 A | 5/1999 |
| JP | 12-058112 A | 2/2000 |
| JP | 12-058113 A | 2/2000 |
| JP | 12-058115 A | 2/2000 |

OTHER PUBLICATIONS

Johnstone et al. "Polymer Electrolyte Based on a Dimethylsiloxane-Polyethylene Oxide," European Polymer Journal, 26(9), 987-90 (1990).*

* cited by examiner

*Primary Examiner*—Dah-Wei Yuan
(74) *Attorney, Agent, or Firm*—Birch, Stewart, Kolasch & Birch, LLP

(57) ABSTRACT

The present invention relates to a non-aqueous electrolyte additive for improving safety and a lithium secondary battery comprising the same, and more particularly to a non-aqueous electrolyte additive that can improve cycle life and safety properties of a lithium ion secondary battery.

According to the present invention, an organometallic compound represented by the Chemical Formula 1 is added to a non-aqueous electrolyte of a battery as an additive, and thus if a battery voltage is out of normal operation voltage range due to a short circuit and overcharge of a battery, etc., the non-aqueous electrolyte additive decomposes and a part of the decomposed additive polymerizes to form an insulating film on a cathode surface, and a part of the metal reacts with an insulating film formed on a cathode surface to improve thermal stability of the battery, thereby improving safety of the battery. Furthermore, in case of a short circuit a part of the metal oxide of the additive is removed an activity of lithium or is reduced movement speed of lithium by reacting with lithium rushed from an anode to a cathode, and thus safety of the battery can be obtained on a short circuit by delaying a flow of current.

3 Claims, 2 Drawing Sheets

NON-AQUEOUS ELECTROLYTE ADDITIVE FOR IMPROVING SAFETY AND LITHIUM ION SECONDARY BATTERY COMPRISING THE SAME

This application is the national phase under 35 U.S.C. § 371 of PCT International Application No. PCT/KR02/00972 which has an International filing date of May 22, 2002, which designated the United States of America.

BACKGROUND OF THE INVENTION (a) Field of the Invention

The present invention relates to a non-aqueous electrolyte additive for improving safety and a lithium ion secondary battery comprising the same, and more particularly to a non-aqueous electrolyte additive that can improve cycle life and safety properties of a lithium ion secondary battery.

(b) Description of the Related Art

In concert with the development of the information electronics industry, studies regarding batteries, which are referred to as the heart of all electronic equipment, are actively in progress. Specifically, a lithium ion secondary battery with a light weight and a high capacity has attracted attention as one of the essential parts of electronic equipment with the miniaturization of high-technology electronics equipment.

The lithium ion secondary battery uses a transition metal complex oxide such as lithium, cobalt, etc. as a cathode active material; a crystallized carbon such as graphite as an anode active material; and an aprotic organic solvent in which lithium salts such as $LiClO_4$, $LiPF_6$, etc. are dissolved as an electrolyte. Such a battery has high performance and a light weight, rendering it suitable as a battery for miniature electronic equipment such as cellular phones, camcorders, notebook computers, etc. However, this battery has many safety problems since it does not use an aqueous electrolyte but instead uses a highly flammable organic solvent as an electrolyte. Safety is the most important aspect of a lithium ion secondary battery using a non-aqueous electrolyte, and specifically, preventing short circuits and overcharging problems are very important factors thereof.

In the lithium secondary battery, the method of stopping a fire of the battery due to a short circuit of the battery have not been well known except a design aspect of the battery. As the capacity of the battery increases, the discharge current increases, and therefore the dangerousness due to a short circuit becomes more serious.

Recently, in order to prevent overcharge, a various additive is developed. This is method that an organic materials added as an additive is decomposed on electrode surface to intercept a current by forming a polymer insulating film on the electrode when reaching fixed overvoltage. However, although the method has superior effect on overcharge, it has a problem reduced cycle life of the battery due to a necessity a many additive in order to reveal its effect.

In addition to, a method involves using electronic circuit shch as the method a mechanically intercepting a current by aggravating the occurrence of gas when overcharging, or the method shutting down a circuit by melting a separator.

As a further method, it is the use of a chemical reaction using a suitable redox shuttle additive in the electrolyte of the lithium battery. However, the method may be effective since overcharge current between a negative electrode and a positive electrode can be consumed, only on condition that reversibility of oxidation-reduction reaction is excellent.

In relation to this method, Japanese Patent Publication No. 1-206571 (1989) discloses that ferrocene compound is applied in the 3 Voltage class batteries, which can be a useful method in terms of cost efficiency. However, because the practical lithium secondary battery has the voltage of about 4V region, the battery needs oxidation-reduction agent undecomposed in the voltage region.

Japanese Patent Publication No. 7-302614 (1995) proposes a new redox shuttle additive applicable in 4V grade, which combines the alkyl group (R: $C_nH_{2n+1}$) or the methoxy group ($OCH_3$) as the electron-donating group of benzene ring. However, because the amperage capable of reversible redox shuttle is low, the effect has been defective in case of high amperage.

U.S. Pat. No. 5,709,968 (1998) discloses that the capability of a redox shuttle in the battery of 4V grade is improved largely by combining benzene with halogen. However, as amperage inflicted in case of overcharge increases with a high capacity of battery, a concentration of additive capable of consuming a current also increases as an adverse effect in a cycle life etc.

SUMMARY OF THE INVENTION

The present invention is made in consideration of the problems of the prior art, and it is an object of the present invention to provide a non-aqueous electrolyte additive that can achieve superior safety even under dangerous circumstances caused by misoperation or misuse of the battery, including a large current discharge due to an overcharge or a short circuit in a 4V grade lithium and lithium secondary battery charged with a large current and a high energy density.

It is another object of the present invention to provide a lithium ion secondary battery comprising the non-aqueous electrolyte additive.

In order to achieve these objects, the present invention provides a non-aqueous electrolyte additive comprising an organometallic compound represented by the following Chemical Formula 1:

[Chemical Formula 1]

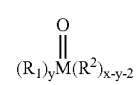

wherein $R^1$ and $R^2$, which are independently or simultaneously an alkyl group with 1 to 4 carbon atoms, an alkoxy group with 1 to 4 carbon atoms, an acetyl group, a sulfonic acid group, or fluorocarbon, acetoxy, $-OSO_3H$, $-CF_3$, or a phenyl group or phenoxy group substituted by an alkyl group with 1 to 4 carbon atoms or a halogen;

M is an atom selected from the group consisting of Al, B, Si, Ti, Nb, V, Cr, Mn, Fe, Co, Ni, Sn, Ga, Zr and Ta;

x is a valence of a central metal atom;

y is a value satisfying $0 \leq y < x-2$.

The present invention also provides a lithium ion secondary battery comprising:

a) an anode capable of adsorbing and releasing lithium;

b) a cathode capable of adsorbing and releasing lithium; and c) a non-aqueous electrolyte comprising an organometallic compound represented by the above Chemical Formula 1.

DETAILED DESCRIPTION AND THE PREFERRED EMBODIMENTS

Figure 1:
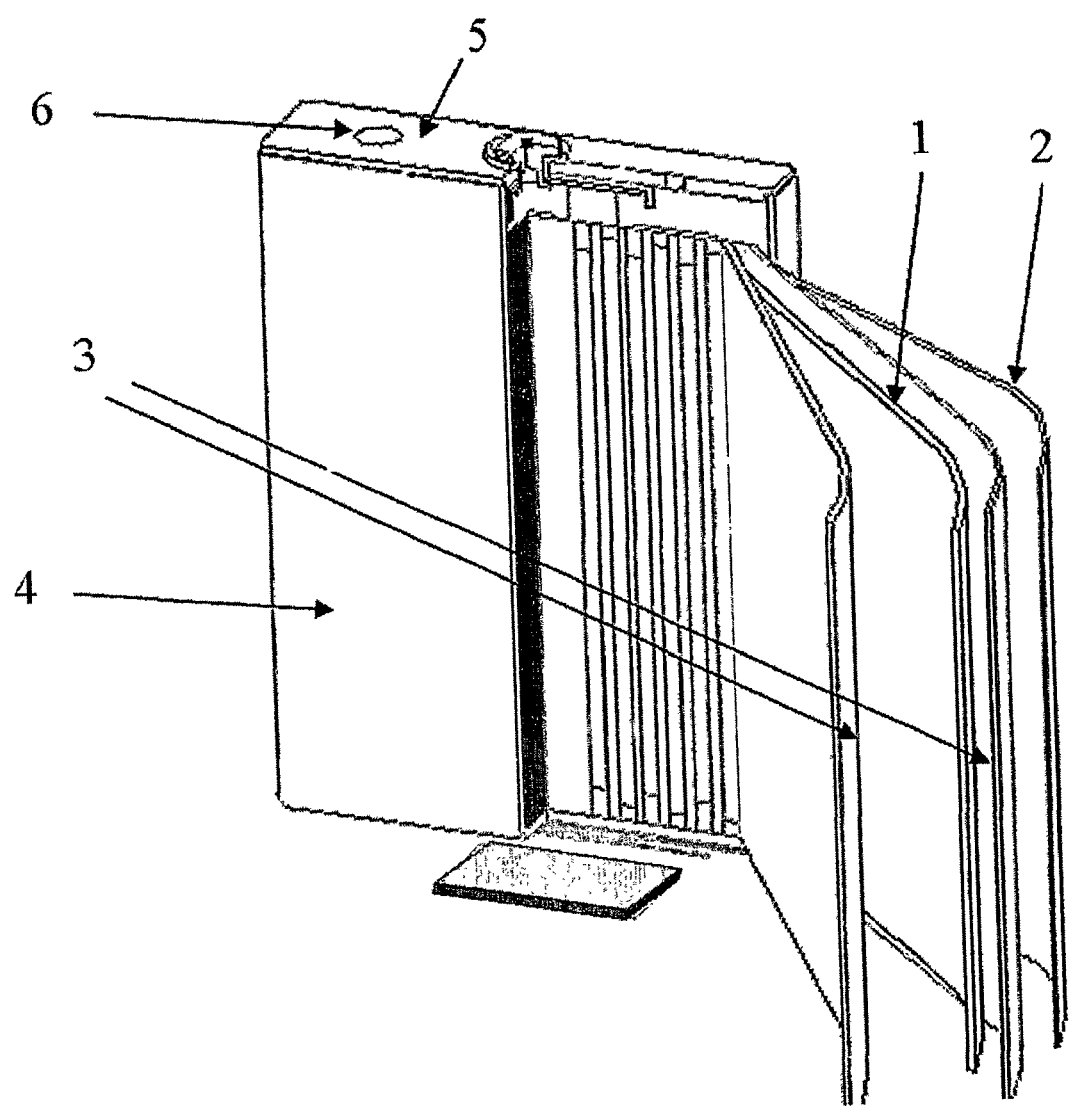
FIG. 1 shows a structure of the lithium ion secondary battery of the present invention.

The present invention will now be explained in detail.

The present invention provides an organometallic compound represented by the above Chemical Formula 1 wherein around the central atom are substituted by a substituent, preferably a phenyl group and oxygen, as a non-aqueous additive for a non-aqueous electrolyte in which a lithium salt is dissolved, for improving safety of a lithium ion secondary battery. In addition, the present invention provides a lithium ion secondary battery that uses lithium or carbon capable of adsorbing and releasing lithium as an anode, a specific complex oxide of lithium and a transition metal as a cathode, and an organometallic compound represented by the Chemical Formula 1 as a non-aqueous electrolyte. According to the present invention, a large current discharge due to a short circuit or overcharge caused by battery misoperation or misuse can be prevented by a chemical reaction of additives included in a non-aqueous electrolyte, and thus safety of a battery can be improved.

The organometallic compound represented by the Chemical Formula 1 used as additive for non-aqueous electrolyte in the present invention does not function in a battery operated within the normal voltage range, and thus it does not affect the cycle life properties of the battery.

On the other hand, if the voltage abnormally increases by being overcharged, etc., additives of the non-aqueous electrolyte of the lithium ion secondary battery that decompose at the surface of the cathode under a completely charged state produce decomposition by-products (preferably benzene-based compounds) that form radicals that polymerize and thereby form an insulating film on a cathode surface. In addition, a metallic inorganic substance of the residue is activated to improve thermal stability of an insulating film formed on the cathode surface. Moreover, at a large current discharge, coordinators hydrated by hydrolysis with moisture are converted into hydroxy functional groups and react with lithium rushed from the anode to form an insulating film on the cathode surface, thereby giving safety to the battery.

Specifically, the organometallic compound represented by the Chemical Formula 1 is preferable benzene-based compound having a stable $R^1$, and it is a metal compound that consists of the oxygen having a strong reactivity with a metal, and $R^2$ having a good affinity with a non-aqueous electrolyte. Therefore, the compound does not function in a battery operated within the normal voltage range. And, since oxygen, a phenyl group and an alkyl group coordinated a metal has superior affinity with a non-aqueous electrolyte, the compound is a good dissolved in the non-aqueous electrolyte, and thus it does not affect the cycle life properties of the battery. Furthermore, the compound has oxygen bonded with a metal, and thus if a sudden current such as a large current discharge flows, the compound decreases the diffusion rate of lithium and it reacts with lithium to form an insulating inorganic compound on the cathode surface, thereby improving safety of the battery due to interception of an electron flow. The organometallic compound represented by the Chemical Formula 1, if a battery is abnormally overcharged in a non-aqueous electrolyte are decomposed into a benzene-based compound and a metal compound having oxygen. The decomposed benzene-based compound forms an insulating polymer film on the cathode surface to intercept a current due to overcharge, and thus the safety of the battery can be obtained. In addition, in order to intercept an electron flow, a reside metal compound reacts with the polymer insulating film, thereby restraining an ignition of the battery caused by exothermic reaction due to overcharge.

In the compound of Chemical Formula 1, $R^1$ and $R^2$ is not a necessity that will be always coexistence, and there are changed by a valance of metal of a central atom due to a bond of a metal of a central atom and oxygen. That is, if the valance of metal is triply-charged, $R^1$ and $R^2$ is not coexistence, and thus the compound existing only one of $R^1$ and $R^2$ becomes. If the valance of metal is fifth-charged, one of $R^1$ and $R^2$ is combined a substituent of 2 or more with the metal of central atom. Furthermore, in case of an additive having many a phenyl group such as $R^1$ and $R^2$, a formation of a polymer insulating film is superior. However, since the oxygen bonded with the metal atom has a high reactivity, at a large current discharge due to a short circuit, the compound reacts with lithium rushed from the anode to form an insulating film on the cathode surface, thereby giving safety to the battery.

As explained, a preferable the compound as a non-aqueous electrolyte additive is a compound that a metal atom is in center and a phenyl group, a sulfonic acid group, a fluorocarbon or an alkyl group with 1 to 4 carbon atoms the around is combined thereto. Wherein, the alkyl group is changed reaction degree according to a value of n, but it is a stable form in an organic solvent. Therefore, a reactivity of the oxygen bonded with the metal existing in the compound changes according to an atom located in center. The metal atom bonded with the oxygen easily reacts with activated lithium to form an insulator of a glass configuration. The phenyl group of the compound provides a benzene-based compound and activated metal oxide by decomposing when overcharging, and thus a safety of the battery further improves by forming a polymer insulating film and a ceramic insulating film forms due to a benzene-based compound. In addition to, the phenyl group of the compound reacts with lithium deposited in the anode to remove activity of lithium and form a ceramic insulating film, thereby providing effective methods for achieving battery safety. If $R^1$ and $R^2$ of the compound is a sulfonic acid group, or a fluorocarbon, when the compound is decomposed due to overcharge and a large current discharge, the thermal stability of the battery can be improved by forming a fireproofing gas.

The ceramic insulating film capable of form in the present invention is an amorphous form, and it can be formed a shape of $Li_2O.MO_x$ (wherein x is changed according to a valance of M) or lithium metal inorganic compound.

According to the present invention, a non-aqueous electrolyte lithium ion secondary battery comprising the compound represented by the Chemical Formula 1 as a non-aqueous electrolyte additive is prepared.

The non-aqueous electrolyte lithium secondary battery of the present invention comprises an anode capable of adsorbing and releasing lithium, a cathode capable of adsorbing and releasing lithium, and a non-aqueous electrolyte comprising the compound represented by the Chemical Formula 1. The anode and cathode capable of adsorbing and releasing lithium are prepared by a common method, and a non-aqueous electrolyte comprising the compound is injected therein to prepare a secondary battery.

The active material for the anode capable of adsorbing and releasing lithium is preferably a carbon-based material selected from the group consisting of graphite, carbon fiber, and active carbon. The anode further comprises a binder, preferably polyvinylidene fluoride (PVDF).

As the active material for the cathode, a lithium transition metal complex oxide represented by the following Chemical Formula 2 can be used.

[Chemical Formula 2]

$$Li_xMO_2$$

wherein M is Ni, Co, or Mn; and x is a value satisfying $0.05 \leq x \leq 1.10$.

The compound represented by the Chemical Formula 1 used as a non-aqueous electrolyte additive in the present invention is present at 0.01 to 20 wt % of the electrolyte. As the non-aqueous electrolyte additive, an aprotic organic solvent wherein lithium salts such as $LiClO_4$, $LiPF_6$, $LiBF_4$, etc. are dissolved is used.

The preferable Example of fabrication of the non-aqueous electrolyte lithium ion secondary battery of the present invention is as shown in FIG. 1.

As shown in FIG. 1, the lithium secondary battery of the present invention comprises an anode 1 formed of an anode current collector on which anode active material is coated, and a cathode 2 formed of a cathode current collector on which cathode active material is coated. The anode and the cathode are rolled together in a jelly roll configuration with a separator 3 therebetween, an insulator is located at upper and lower sides of the anode and cathode roll, and a can 4 receives it. A battery cover 5, enclosed with a laser, seals the battery can 4. The battery cover 5 is electrically connected to the cathode 2 through a cathode lead, and the can 4 is electrically connected to the anode 1 through an anode lead. For the battery of the present invention, the cathode lead is welded to a pressure-release valve 6 in which a protuberance selectively seals a pressure-release vent, and thus the cathode lead electrically connects with the battery cover 5 through the pressure-release valve 6. In a battery with this construction, when pressure inside the battery increases, the protuberance of the pressure-release valve 6 is forced from the vent, and inner pressure is released through the vent.

The present invention will be explained in more detail with reference to the following Examples and the Comparative Example. However, these are to illustrate the present invention and the present invention is not limited to them.

EXAMPLE 1

A non-aqueous electrolyte lithium ion secondary battery was prepared as follows:

Preparation of an Anode

After mixing carbon powder and polyvinylidene fluoride (PVDF) as a binder in a weight ratio of 90:10, the mixture was dispersed in N-methyl-pyrrolidone (NMP) as a solvent to prepare an anode mixture slurry. The anode mixture slurry was uniformly coated on both sides of an anode current collector Cu foil at a thickness of 10 μm and dried, and then was compression molded with a roll press to prepare an anode of a band shape.

Preparation of a Cathode

Lithium carbonate and cobalt carbonate were mixed in a mole ratio of 1:1 and calcined at 900° C. for 7 hours to obtain $LiCoO_2$. 92 wt % of the lithium cobalt complex oxide, 4 wt % of carbon as a conductor, and 4 wt % of PVDF as a binder were added to a solvent NMP to prepare a cathode mixture slurry. The cathode mixture slurry was coated on a cathode current collector Al thin film at a thickness of 20 μm and dried, and then was compression molded with a roll press to prepare a cathode of a band shape.

Porous polyethylene film was used as a separator, and the band-shaped anode and the band-shaped cathode were laminated and rolled together in a jelly roll configuration. The length and width of the anode and cathode roll were controlled so as to be appropriately received into a battery can of a rectangle with a height of 48 mm, a width of 30 mm, and a thickness of 6.0 mm. The anode and cathode roll was deposited in the battery can with insulating plates disposed above and below it. Then, an anode lead formed of nickel was attached to the anode current collector and welded to the battery can, and a cathode lead formed of aluminum that was connected to the cathode current collector was welded to an aluminum pressure-relief valve mounted at the battery cover.

The non-aqueous electrolyte of the present invention was then injected into the fabricated battery. A solvent for the non-aqueous electrolyte was a mixed solvent of EC and EMC at a ratio of 1:2. $LiPF_6$ was used as an electrolyte, and diphenyl disilanediol was added at 2 wt % of the electrolyte to prepare a non-aqueous electrolyte.

The fabricated battery was charged to 4.2 V with a constant current of 0.4 $mA/cm^2$. Standard capacity of a non-aqueous electrolyte secondary battery is 700 mAh and charge/discharge cycles were performed at a rate of 1 C (700 mA/h) with a constant current of from 4.2 V to 3 V.

EXAMPLES 2 TO 7

A non-aqueous electrolyte secondary battery was fabricated by the same method as in Example 1, except that compounds shown in Table 1 were used as additives instead of titanium oxide acetyl acetonate.

COMPARATIVE EXAMPLE

A secondary battery was fabricated by the same method as in Example 1, except that no additive was added to the non-aqueous electrolyte.

Experiment 1

The batteries fabricated in Examples 1 to 7 and the Comparative Example were charged and pins were passed through them to perform pin tests, and the results are as shown in Table 1.

TABLE 1

| | Additive | Whether or not exploded as a result of pin test |
|---|---|---|
| Example 1 | Titanium oxide acetyl acetonate | No explosion |
| Example 2 | Diphenyl tin oxide | No explosion |
| Example 3 | Tin ethyl hexanoate | No explosion |
| Example 4 | Phenyl boric anhydride | No explosion |
| Example 5 | [1,2-benzene diolato(2)-o,o]oxotitanium | No explosion |
| Example 6 | Phenyl methyl silicon oxide | No explosion |
| Example 7 | p-tolyl boronic anhydride | No explosion |

TABLE 1-continued

| | Additive | Whether or not exploded as a result of pin test |
|---|---|---|
| Comparative Example | None | Explosion |

As shown in Table 1, the batteries of Examples 1 to 7 comprising non-aqueous electrolytes to which additives were added did not ignite or explode after having pins passed through them and being short circuited, even after charging. This is because in the additive-added non-aqueous electrolyte, at a large current discharge due to a short circuit, a speed of lithium rushed from an anode is controlled or lithium rushed from an anode reacts with lithium rushed from a cathode surface to form an insulating film on the surface.

Experiment 2

The cycle life properties and maximum temperature after blocking current by overcharge of the batteries fabricated in Examples 1 to 7 and the Comparative Example are shown in Table 2.

TABLE 2

| | Cycle life property (%) | Overcharge Test | Whether or not exploded |
|---|---|---|---|
| | Capacity fraction (capacity after 100 cycles/initial capacity) | Maximum temperature of battery after blocking current (° C.) | No explosion |
| Example 1 | 97 | 117 | No explosion |
| Example 2 | 95 | 114 | No explosion |
| Example 3 | 97 | 116 | No explosion |
| Example 4 | 90 | 113 | No explosion |
| Example 5 | 95 | 118 | No explosion |
| Example 6 | 96 | 119 | No explosion |
| Example 7 | 94 | 111 | Explosion |
| Comparative Example | 95 | 122 | |

As can be seen from Table 2, adding a compound represented by the Chemical Formula 1 as an additive, although slight variations occur according to the kinds of compounds, generally improves cycle life properties. Regarding maximum temperature after blocking current by overcharge, the battery of the Comparative Example comprising an electrolyte without an additive exploded by thermal influx, but those of Examples 1 to 7 with additives were prevented from ignition by thermal influx. It is considered that, at overcharge, the additive forms a polymer insulating film on the cathode surface to block the overcharge current or reduce the activity of lithium that causes battery ignition.

Figure 2:
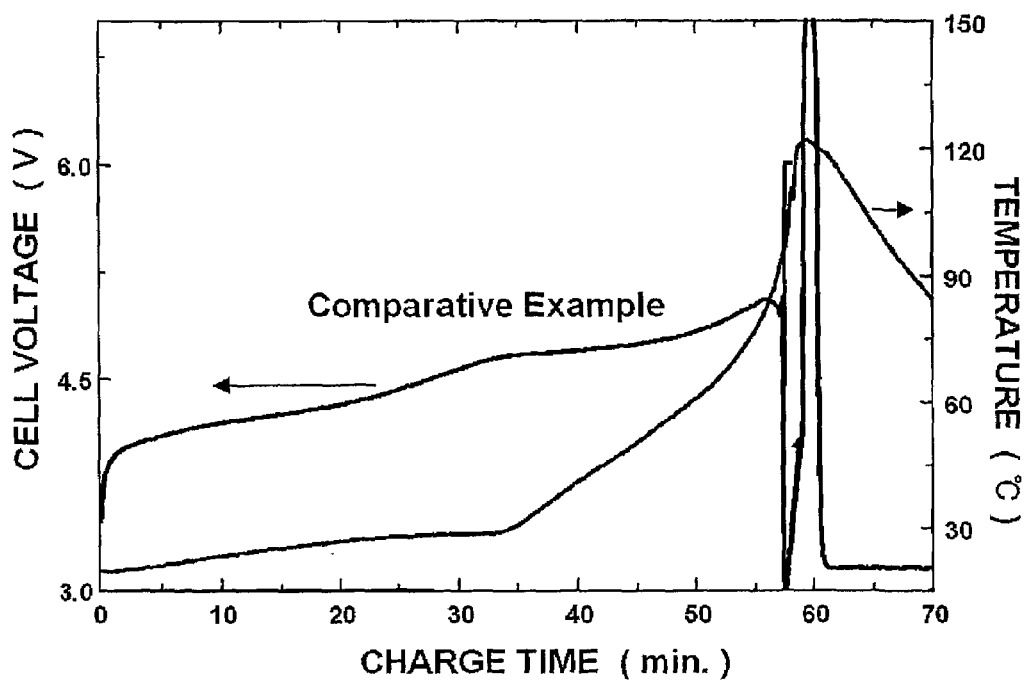
FIG. 2 shows change in temperature and voltage of the battery of the Comparative Example, according to overcharge time.
Figure 3:
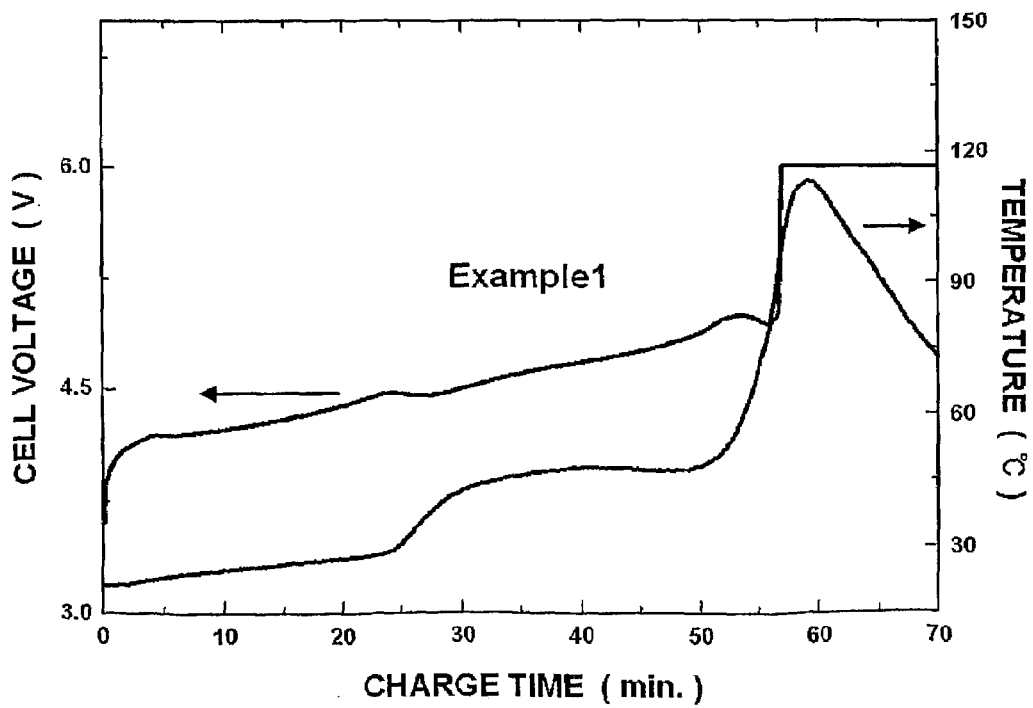
FIG. 3 shows change in temperature and voltage of the battery of Example 1 of the present invention, according to overcharge time.

FIGS. 2 and 3 was shown change in temperature and voltage of batteries of Example 1 and Comparative Example according to overcharge time respectively. As shown in FIG. 2, the battery of the Comparative Example without an additive have a short circuit before was arrived in a fixed voltage value by occurring explosion due to a rise of a temperature according to overcharge.

On the other hand, in case of the battery of Example 1 a rise of a temperature was a low, and the temperature was decreased after was arrived in a fixed voltage without a short circuit compared with Comparative Example.

As explained, according to the present invention, an organometallic compound represented by the Chemical Formula 1 is added to a non-aqueous electrolyte of a battery as an additive, and thus, if a battery voltage is out of normal operation voltage range due to a short circuit and overcharge of the battery, an additive decomposes and a part of the decomposed additive forms an insulating film on a cathode surface, and metal reacts with the insulating film formed on the cathode surface to improve thermal stability of the battery, thereby improving safety of the battery. Furthermore, in case of a short circuit a part of the metal oxide of the additive is removed an activity of lithium or is reduced movement speed of lithium by reacting with lithium rushed from an anode to a cathode, and thus safety of the battery can be obtained on a short circuit by delaying a flow of current.

What is claimed is:

1. A non-aqueous electrolyte solution comprising a lithium salt, an aprotic solvent, and an organometallic compound represented by the following Chemical Formula:

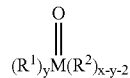

wherein $R^1$ and $R^2$, which are independently or simultaneously an alkyl group with 1 to 4 carbon atoms, an alkoxy group with 1 to 4 carbon atoms, an acetyl group, a sulfonic acid group, or fluorocarbon, acetoxy, $-OSO_3H$, $-CF_3$, or a phenyl group or phenoxy group substituted by an alkyl group with 1 to 4 carbon atoms or a halogen;

M is an atom selected from the group consisting of Al, B, Si, Ti, Nb, V, Cr, Mn, Fe, Co, Ni, Ga, Zr and Ta;

x is a valence of a central metal atom; and y is a value satisfying $0 \leq y < x-2$.

2. A lithium ion secondary battery comprising:
a) an anode capable of adsorbing and releasing lithium;
b) a cathode capable of adsorbing and releasing lithium; and
c) a non-aqueous electrolyte solution comprising a lithium salt, an aprotic solvent, and an organometallic compound represented by the following Chemical Formula:

[Chemical Formula 1]

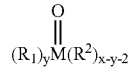

wherein $R^1$ and $R^2$, which are independently or simultaneously an alkyl group with 1 to 4 carbon atoms, an alkoxy group with 1 to 4 carbon atoms, an acetyl group, a sulfonic acid group, or fluorocarbon, acetoxy, $-OSO_3H$, $-CF_3$, or a phenyl group or phenoxy group substituted by an alkyl group with 1 to 4 carbon atoms or a halogen;

M is an atom selected from the group consisting of Al, B, Si, Ti, Nb, V, Cr, Mn, Fe, Co, Ni, Ga, Zr and Ta;

x is a valence of a central metal atom; and y is a value satisfying $0 \leq y < x-2$.

3. The lithium ion secondary battery according to claim 2, wherein the c) organometallic compound is contained in an amount of 0.01 to 20 wt % of electrolyte.

* * * * *